J. A. BOWDEN.
TREAD FOR TIRES.
APPLICATION FILED APR. 16, 1908.
1,037,116.
Patented Aug. 27, 1912.
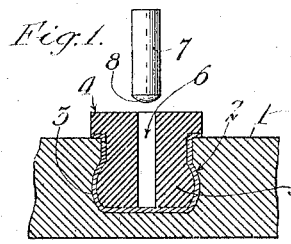
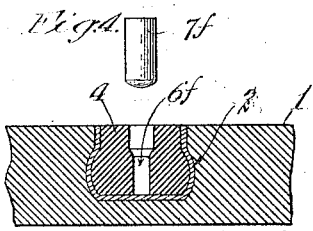
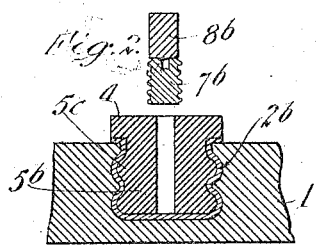
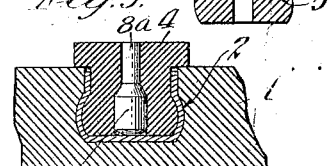
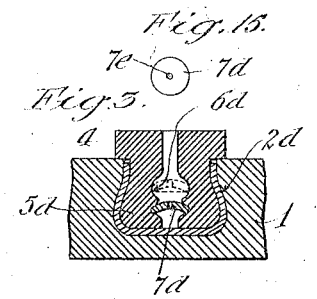
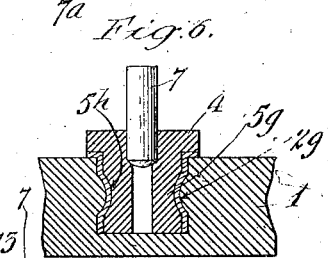
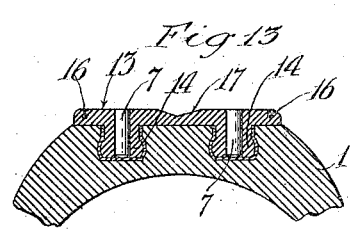
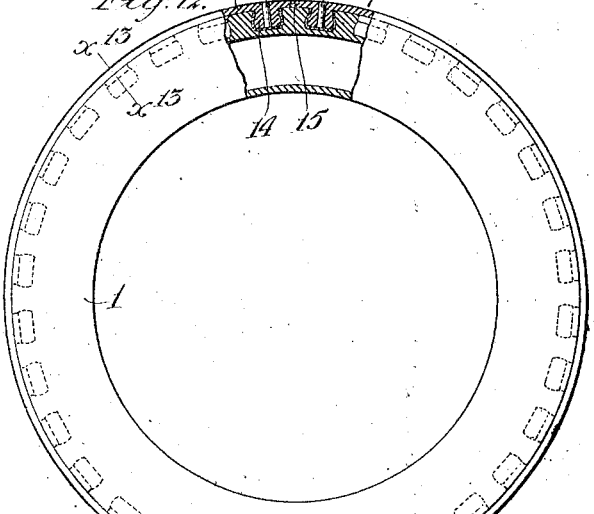
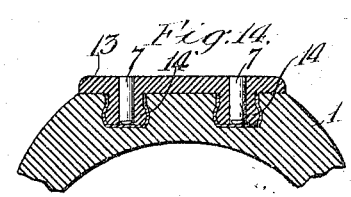
Witnesses:
Inventor:
Junius A. Bowden

UNITED STATES PATENT OFFICE.

JUNIUS A. BOWDEN, OF LOS ANGELES, CALIFORNIA.

TREAD FOR TIRES.

1,037,116.　　　Specification of Letters Patent.　　Patented Aug. 27, 1912.

Application filed April 16, 1908. Serial No. 427,544.

*To all whom it may concern:*

Be it known that I, JUNIUS A. BOWDEN, a citizen of the United States, residing at Los Angeles, in the county of Los Angeles and State of California, have invented a new and useful Tread for Tires, of which the following is a specification.

This invention relates to a tread for tires, being adapted either for pneumatic, cushion or solid tires, and the main object of the invention is to provide a renewable tread portion which may be detachably applied to the tire so as to be readily removable therefrom when worn and it is desired to substitute a new tread.

The invention also consists in a simple and effective means for locking the renewable tread in place.

Referring to the drawings:—Figure 1 is a cross section through one form of renewable tread portion, one form of key adapted for use therein being shown in elevation, removed therefrom. Fig. 2 is a sectional view through another form of renewable tread portion showing the key in section and removed therefrom. Fig. 3 is a sectional view showing another form of renewable tread portion, dotted lines showing position of the key in process of being inserted, and the key being shown in section in its final position. Fig. 4 is a view similar to Fig. 1 showing still another form. Fig. 5 is a view similar to Fig. 1 showing still another form with the key in position. Fig. 6 is a view similar to Fig. 1, showing another form with the key partly in place. Fig. 7 is a cross sectional view through a plug of the form used in Fig. 5. Fig. 8 is a plan view of a plug. Fig. 9 is a plan view of a modified form of receptacle. Fig. 10 is a side elevation of the lower portion of the key used in the form shown in Fig. 2. Fig. 11 is a cross sectional view through a modified form of key. Fig. 12 is a side elevation of a tire provided with a ring shaped renewable portion, the tire being shown partly in section to illustrate the locking features. Fig. 13 is a cross section on line $x^{13}$—$x^{13}$, on an enlarged scale, through the outer portion of the tire shown in Fig. 12. Fig. 14 is a view similar to Fig. 13 showing a slightly modified form. Fig. 15 is a plan view of the key used in Fig. 3. Fig. 16 is a cross sectional view through a modified form of the plug. Fig. 17 is an elevation view of the key used in Fig. 16.

Briefly, the invention comprises a renewable tread portion for a tire which has a locking portion adapted to be received in the tire which locking portion is prevented from contracting by a key inserted in the locking portion so that the locking portion is caused to tightly fit the cavity in the tire. The cavity in the tire, or the locking portion, or both, have, preferably, variant diameters which results in locking the same together until the key is removed. The hole in the renewable tread portion serves two very important purposes, viz., to provide for the key for locking it in place, and when the key is removed the hole permits of the plug readily contracting to permit removal of the plug.

In one form of the invention this renewable tread may consist of plugs formed preferably of rubber which are detachably inserted and locked as before described.

One form of plug is shown in Fig. 1 in which 1 designates the tire within which is embedded a receptacle 2 formed preferably of metal and having an enlarged lower bulbous portion 3. 4 designates the renewable tread portion, which comprises a plug formed preferably of rubber and having a locking portion 5 which has variant diameters so that it fits the receptacle 2, as shown. The wearing portion of the plug 4 extends above the surface of the tire 1 and is flanged and forms the tractive portion of the tire. The plug is locked in place by means of a key which is inserted in a hole 6 formed in the center of the plug. One form of key may comprise a cylindrical member 7 having a rounded lower end 8. When the plug 7 is inserted it expands the plug 4 causing it to tightly grip the receptacle and when the lower portion of the plug is expanded the plug is locked in position.

In the form shown in Fig. 2 the plug 4 has a locking portion $5^b$ formed with two circular ribs $5^c$ and the receptacle $2^b$ is formed to fit the locking portion $5^b$ as shown. In this form the key comprises a lower portion $7^b$ threaded as shown in detail in Fig. 10, and having in its upper end a slot $7^c$ for the insertion of a screw driver, not shown, to screw the key into position or unscrew the same. The upper portion of the key comprises a rubber cylinder $8^b$ which may have the same elasticity as the plug 4 while the lower portion $7^b$ is preferably formed of hard rubber or metal or composition which will permit it to be easily screwed into or out of position and afforded the necessary resistance against the locking portion 5$^b$ to prevent the latter from yielding inwardly when the key is in place. In this form, the key being in two sections, allows the upper protruding portion of the plug 4 to yield laterally slightly, whereas, with the key 7 shown in Fig. 1, which is substantially rigid throughout, this effect is not produced.

In the form shown in Fig. 3 the plug 4 has a locking portion 5$^d$ of a bulbous shape and the receptacle 2$^d$ is shaped to fit the same. The plug 4 is hollow as in the preceding forms, but is provided with an enlarged cavity 6$^d$ which enables the key 7$^d$ to be easily placed in position. In this form the key is shown as a concavo-convex disk having a perforation 7$^e$ in its center. Dotted lines show the disk in position in the cavity 6$^d$, while the disk is shown in full lines stationed in its final resting place at a point below in the cavity 6$^d$ but above the bottom of the receptacle 2$^d$. The perforation 7$^e$ is provided so that a wire or other device may be inserted through the disk to remove the same when it is desired to renew a plug. The perforation also enables the placing of the disk in position by means of any suitable instrument, not shown. It will be noted that when the disk is in its final position it forces out the lower locking portion 5$^d$ of the plug and locks it within the receptacle 2$^d$.

In the form shown in Fig. 4 the plug 4 is contained wholly within the receptacle 2 so that the face of the plug is flush with the surface of the tire. As indicated in this form, the plug 4 may have a hole 6$^f$ of two diameters so that when the cylindrical plug 7$^f$ is inserted the lower portion of the plug is expanded the requisite degree without unduly expanding the upper portion of the plug.

In the form shown in Fig. 5, the plug 4 may have a hole of even diameter throughout, as shown in detail in Fig. 7, and the key may have an enlarged lower portion 7$^a$ and a reduced upper portion 8$^a$. It will be noted that this produces practically the effect attained by the form shown in Fig. 4, the result in both cases being to expand the lower portion of the plug without unduly expanding the upper portion thereof.

In the form shown in Fig. 6 the plug 4 has a locking portion 5$^g$ of variant diameters being formed with a concave groove 5$^h$ at its center and the receptacle 2$^g$ is shaped to fit. In this form the key 7 is shown as having been partly pushed into position. It should be noted in this form that receptacle 2$^g$ does not have any bottom and that the bottom of the plug 4 rests directly against the tire 1.

Fig. 7 shows the rubber plug 4 used in the forms of both Figs. 1 and 5, removed.

Fig. 12 shows a complete tire having a circular tread portion 13 which encircles the tire and which is provided with a series of inwardly projecting plugs 14 which may have any of the contours before described, as, for example, the contour similar to that shown in Fig. 4. The circular tread portion 13 is secured in place by keys 7 which act in the manner above described. The two ends of the circular tread portion 13 meet at 15 and are scarfed at the joint. By removing the keys 7 the circular tread portion 13 may be removed.

Fig. 13 shows a cross section through this form and illustrates how the plugs 14 may be arranged in pairs opposite each other and wires 16 may girdle the circular tread portion 13, the wires being laid into circumferential grooves formed in the circular tread portion 13 near to the sides thereof so the wires will keep in place, the material of the tread portion closing over them when they are in position. The circular tread portion 13 has a shallow central groove 17 which may be found advantageous in promoting the tractive qualities.

Fig. 14 shows a slight modification over that of Fig. 13 wherein the wires 16 are omitted and the center groove 17 is omitted.

In the form of receptacle shown in Fig. 9 its longitudinal walls are scalloped, as shown.

In the form of key shown in Fig. 11 the lower section 7$^h$ is separate from the upper portion 8$^h$, the latter having a stud 9$^h$ which projects into the lower portion 7$^h$. In this form the lower portion 7$^h$ may consist of a relatively hard material while the upper portion 8$^h$ may consist of rubber having the same yielding qualities as that in the exposed portion of the plug 4.

Fig. 16 shows a modification in which the locking portion 25 of the plug is cylindrical with straight walls; the receptacle 2 is enlarged at the bottom as in preceding forms. The key shown in Fig. 17 is employed and has an enlarged lower end 7$^a$ which when in place forces out the walls of the plug so that they interlock with the receptacle.

The purpose of the top flange 30, shown in some of the forms, is to prevent unnecessary wear or cutting of the flanged end of the plug, which wear would form a space in which grit would collect and increase the wear.

It will be noted that in all of these forms shown the essential features of the invention are present and the renewable portions may be readily detached when desired for the purpose of renewal or for other purposes. The plugs when attached in place project from the surface of the tire and from the wearing portion so that the main body of the tire 1 is saved from wear and thus may be used for a long time, the plugs being readily renewable when worn down, as indicated in Fig. 4. Obviously, when the plugs are worn down as indicated in Fig. 4, they need not necessarily be renewed as the tire will then serve just as an ordinary tire except that puncture will be minimized. With the exception of the form shown in Fig. 6, the bottoms of the receptacles act to minimize puncture, in addition to their capacity of affording an unyielding wall to interlock with the plugs. In any of the forms, when the key is removed, the plug will be permitted to contract so that it may be withdrawn from the receptacle, while when the key is in place it prevents the plug from contracting and holds it in firm engagement, interlocked with the receptacle, and as the receptacles are by reason of their contour locked in the tire and as they are also preferably vulcanized to the tire, the plugs are thus positively retained in the tire until it is desired to remove them.

What I claim is:—

1. A detachable tread portion for vehicle tires having a portion of variant diameters seated in the tire, and means insertible in said portion for spreading the same to detachably lock it in position.

2. A detachable tread portion for vehicle tires having a hollow rubber locking portion of variant diameters seated in the tire, and a detachable key filling the hollow portion and preventing it from contracting and unlocking from the tire.

3. A detachable tread portion for tires having a locking portion of variant diameters, a receptacle seated in the tire and fitting the locking portion, and means removable from the locking portion for holding the locking portion in close engagement with the receptacle.

4. A detachable hollow rubber tread portion for tires having a locking portion seated in the tire, and a substantially incompressible key detachably fitted in said hollow portion and holding the same in detachable engagement with the tire.

5. A detachable hollow rubber tread portion for tires having a locking portion, a metallic receptacle embedded in the tire and engaging said locking portion, and a substantially incompressible key detachably inserted in said locking portion to lock the same in said receptacle.

6. As a new article of manufacture, a detachable tread portion for vehicle tires comprising a hollow member having a shank of variant diameters.

7. As a new article of manufacture, a detachable tread portion for vehicle tires comprising a hollow rubber plug having a flanged top and having variant diameters below the top.

8. A vehicle tire with a pocket containing an elastic hollow plug and means fitted within said plug for detachably securing the plug within said pocket.

9. A vehicle tire having a fixed tread portion, a metal cup permanently secured therein, a rubber plug with a longitudinal hole in it, said plug fitted in said cup, and a member fitted in said hole.

10. A detachable tread portion for vehicle tires having a portion of variant cross sectional areas seated in the tire, and means insertible in said portion to prevent contraction of said portion and lock it in place.

11. A vehicle tire having a fixed tread portion, a flanged top metal cup permanently secured therein, a rubber plug with a longitudinal hole in it, said plug fitted in said cup, and a member fitted in said hole.

12. A vehicle tire comprising a tread portion having a series of cavities formed therein, a series of expansible plugs seated in said cavities and projecting slightly beyond said tread portion to form wearing surfaces, each of said plugs having a longitudinal hole extending through it from end to end, and a detachable key of greater diameter than the unexpanded diameter of the hole seated in the hole and expanding the plug into close engagement with the cavity in which it is seated.

13. A vehicle tire comprising a circular portion having a series of cavities therein, a series of rubber plugs inserted in said cavities, each plug having a hole extending through it from end to end, and a cylindrical key inserted in the hole in each plug for expanding the plug into tight engagement with the cavity.

14. A vehicle tire comprising a circular portion having a series of cavities therein, a metallic cup closely fitting in each cavity, a rubber plug closely fitting in each cup, each plug having a longitudinal hole, and a key inserted in said hole and expanding said plug into tight engagement with said metallic cup.

In testimony whereof, I have hereunto set my hand at Los Angeles, California, this 9th day of April 1908.

JUNIUS A. BOWDEN.

In presence of—
  GEORGE T. HACKLEY,
  FRANK L. A. GRAHAM.